United States Patent
Cavalcanti et al.

(10) Patent No.: US 9,814,069 B2
(45) Date of Patent: Nov. 7, 2017

(54) CHANNEL RESERVATION IN FLEXIBLE WIRELESS NETWORKS

(75) Inventors: Dave Alberto Tavares Cavalcanti, Ossining, NY (US); Jianfeng Wang, Ossining, NY (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 294 days.

(21) Appl. No.: 13/141,524

(22) PCT Filed: Dec. 2, 2009

(86) PCT No.: PCT/IB2009/055468
§ 371 (c)(1),
(2), (4) Date: Jun. 22, 2011

(87) PCT Pub. No.: WO2010/073158
PCT Pub. Date: Jul. 1, 2010

(65) Prior Publication Data
US 2011/0261793 A1  Oct. 27, 2011

Related U.S. Application Data

(60) Provisional application No. 61/140,097, filed on Dec. 23, 2008.

(51) Int. Cl.
*H04W 4/00* (2009.01)
*H04W 74/04* (2009.01)
(Continued)

(52) U.S. Cl.
CPC .......... *H04W 74/04* (2013.01); *H04W 72/04* (2013.01); *H04W 74/02* (2013.01); *H04W 84/18* (2013.01); *H04W 88/182* (2013.01)

(58) Field of Classification Search
CPC ..... H04W 84/18; H04W 88/06; H04W 72/04; H04W 72/0406; H04W 72/042;
(Continued)

(56) References Cited

U.S. PATENT DOCUMENTS 5,787,080 A * 7/1998 Hulyalkar et al. ......... 370/310.2
6,907,044 B1   6/2005 Yonge, III
(Continued)

FOREIGN PATENT DOCUMENTS

EP        1120939 A1   8/2001
WO   WO2005076544 A1   8/2005
(Continued)

OTHER PUBLICATIONS

Standard ECMA-368, Dec. 2007, ECMA international, 2nd Edition.*
(Continued)

Primary Examiner — Kwang B Yao
Assistant Examiner — Harun Chowdhury
(74) Attorney, Agent, or Firm — Larry Liberchuk

(57) ABSTRACT

Channel access time slots are reserved in a wireless network employing a flexible medium access control (MAC) protocol. At least a type and a mode of the channel reservation are determined (S310). A reservation request frame is generated (S320) based on the determined type and mode of the channel reservation. The reservation request frame is sent to a reservation proxy device (S330). In response to the reservation request frame, a reservation response frame is received from the reservation proxy device (220-RP). Usage of an allocated time slot is announced if a channel reservation request is confirmed in the reservation response frame (S382).

12 Claims, 4 Drawing Sheets

(51) Int. Cl.
*H04W 72/04* (2009.01)
*H04W 74/02* (2009.01)
*H04W 84/18* (2009.01)
*H04W 88/18* (2009.01)

(58) Field of Classification Search
CPC ..... H04W 84/12; H04W 88/08; H04W 28/16; H04W 16/14; H04W 74/04; H04W 74/02; H04W 88/182
USPC ....... 370/322, 329, 347, 348, 442, 445, 447, 370/338, 392, 310.2, 336, 341, 346; 455/425, 453
See application file for complete search history.

(56) References Cited

U.S. PATENT DOCUMENTS

| | | | |
|---|---|---|---|
| 8,467,357 B2 | 6/2013 | Wang | |
| 2003/0125087 A1* | 7/2003 | Shimizu | H04W 74/02 455/453 |
| 2003/0161340 A1 | 8/2003 | Sherman | |
| 2005/0169221 A1* | 8/2005 | Bennett | 370/338 |
| 2007/0111742 A1* | 5/2007 | Zhang et al. | 455/517 |
| 2008/0009280 A1* | 1/2008 | Ushiki et al. | 455/425 |
| 2008/0259895 A1* | 10/2008 | Habetha et al. | 370/345 |
| 2010/0260085 A1* | 10/2010 | Wang et al. | 370/311 |

FOREIGN PATENT DOCUMENTS

WO  WO 2007/106042  *  9/2007
WO  WO2007106042 A1  9/2007

OTHER PUBLICATIONS

WIPO publication of WO 2007106042.*
Luca De Nardis et al., "Overview of the IEEE 802.15.4/4a standards for low data rate Wireless Personal Data Networks", Positioning, Navigation and Communication, 2007. WPNC '07. 4th Workshop on, IEEE, PI, Mar. 1, 2007 (Mar. 1, 2007), pp. 285-289, XP031080651.
ECMA International: "Standard ECMA-368 High Rate Ultra Wideband PHY and MAC Standard 2nd edition", Internet Citation, Dec. 1, 2007 (Dec. 1, 2007), pp. I-VIII,1, XP002563778, Retrieved from the Internet: http://www.ecma-international.org/publications/files/ECMA-ST/ECMA-368%202ndc/020edi ti on%20December%202007.pdf>.
E. Carlson et al., "A distributed end-to-end reservation protocol for IEEE 802.11-based wireless mesh networks", JSAC, Nov. 2006. IEEE.
IEEE 802.11, "Amendment to Part 11: Wireless LAN Medium Access Control (MAC) and Physical Layer (PHY) Specifications: Medium Access Control (MAC) Quality of Services Enhancements," P802.11e/D.13.0, Jan. 2005.

* cited by examiner

| 410 | 420 | 430 | 440 | 450 | 460 | 470-1 | 470-N |
|---|---|---|---|---|---|---|---|
| Element ID | Length | CRP Control | Owner DevAddr | RP DevAddr | Target DevAddr | CRP Allocation | CRP Allocation |

CHANNEL RESERVATION IN FLEXIBLE WIRELESS NETWORKS

This application claims the benefit of U.S. Provisional Application No. 61/140,097 filed on Dec. 23, 2008.

The invention generally relates to wireless communication networks and, more particularly, channel reservations in such networks.

Medium Access Control (MAC) protocols for wireless networks are typically either distributed or centralized MAC protocols. When a distributed MAC protocol is being utilized, no single device has an absolute control over the wireless medium. In this case, devices contend for the channel in a distributed way, e.g., using a Carrier Sense Medium Access (CSMA). Some distributed MAC protocols, such as Distributed Reservation Protocol (DRP) allow channel reservations on a device-pair basis. That is, devices can use a contention based protocol or periodically transmit beacons to request a channel reservation for a medium access time slot during which a device can access the channel (or medium). When beacons are utilized, all devices are required to send beacons in order to enable efficient device discovery and distributed channel reservation. The distributed MAC protocol is efficient in supporting peer-to-peer applications.

In the centralized operation mode, a single coordinator device (also referred to as a cluster-head, a master, or an access point) controls the access to the channel among the devices. The coordinator device grants channel reservations and schedules transmission opportunities for other devices in the network. The coordinator device is typically responsible for controlling other tasks, such as channel selection, coexistence, and protection of incumbents. An example for a centralized MAC is the HCCA mode defined by the IEEE 802.11 work group in "Amendment to Part 11: Wireless LAN Medium Access Control (MAC) and Physical Layer (PHY) Specifications: Medium Access Control (MAC) Quality of Services Enhancements," P802.11e/D.13.0, January 2005.

A centralized MAC protocol is usually utilized when a coordinator device is needed to distribute and manage traffic or when periodic control information need not be sent by all devices in the network. For example, video distribution in a home network is typically controlled by the service provider's equipment, such as a set-top box or an access point.

A Flexible MAC (Flex-MAC) protocol is also discussed in the related art and was mainly designed to support both centralized and distributed modes, and to enable a smooth transition from one operation mode to another. That is, a flexible MAC typically enables the devices to switch from a distributed to centralized operation mode (and vice versa) without interrupting ongoing connections.

The Flex-MAC is based on a flexible superframe 100, depicted in FIG. 1. The superframe 100 includes a beacon period (BP) 110, a data/sense/sleep period (DSSP) 120, and a signaling window (SW) 130. The time periods of the SW 130 and BP 110 are adjustable and used for broadcasting/exchanging control information. All the devices should keep awake during the BP 110 and signaling window 130 in order to capture all the control/management information which may be applied to every device in the network. A device may exchange data, monitor a channel (needed in cognitive networks), or enter a sleep mode during the DSSP 120.

Channel reservation is a fundamental component in the MAC layer to guarantee QoS in wireless systems that share radio spectrum, especially in networks utilizing unlicensed bands. Existing channel reservation protocols are designed for networks that operate in either centralized or distributed mode. In addition, such reservation protocols are based on a static operation mode and cannot alternate between centralized and distributed modes seamlessly. Thus, any channel reservation protocols cannot be efficiently applied to Flex-MAC architecture.

Therefore, it would be an advantageous to provide a solution that cures the deficiencies of the existing channel reservation techniques discussed above.

Certain embodiments of the invention include a method for reserving channel access time slots in wireless networks employing a flexible medium access control (MAC) protocol. The method comprises determining at least a type and a mode of channel reservation; generating a reservation request frame; sending the reservation request frame to a reservation proxy device; in response to the reservation request frame, receiving a reservation response frame from the reservation proxy device; and announcing usage of allocated channel time if a channel reservation request is confirmed.

Certain embodiments of the invention further include a network device configured to reserve channel access time slots in a wireless network employing a flexible MAC protocol. The network device comprises a determination unit for determining at least a type and a mode of the channel reservation; a frame generator for generating a reservation request frame based on the determined type and mode of the channel reservation; a transmitter for transmitting the reservation request frame, wherein the transmitter is further configured to transmit a message for announcing usage of an allocated time slot if a channel reservation request is confirmed in a received reservation response frame; and a receiver for receiving a reservation response frame from the reservation proxy device in response to the reservation request frame.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
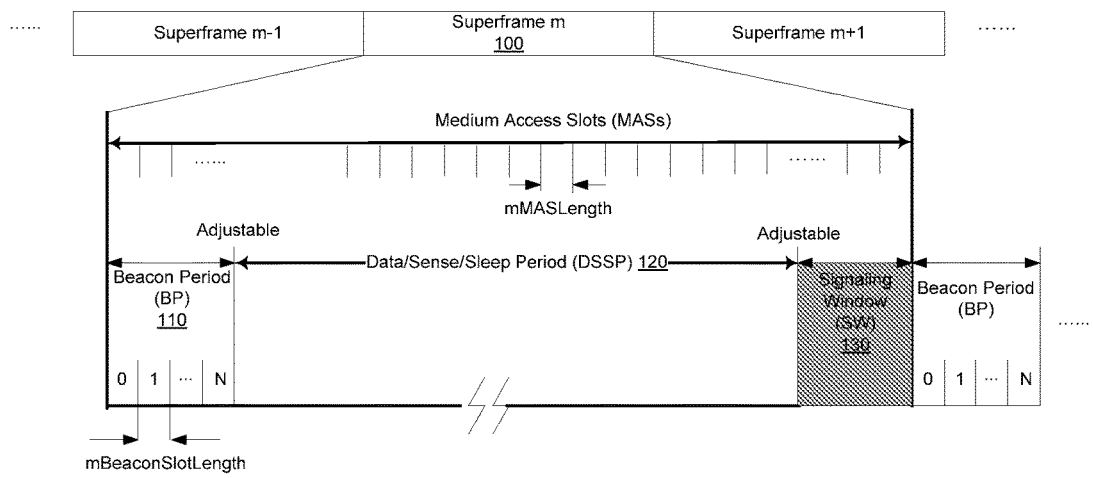
FIG. 1 is a diagram illustrating the structure of a Flex-MAC superframe.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments of the invention, a channel reservation protocol (CRP) for wireless networks employing a flexible MAC protocol is disclosed in this application. The CRP allows devices in the network to reserve access time to the channel (or medium) during the DSSP 120 shown in FIG. 1.

Figure 2:
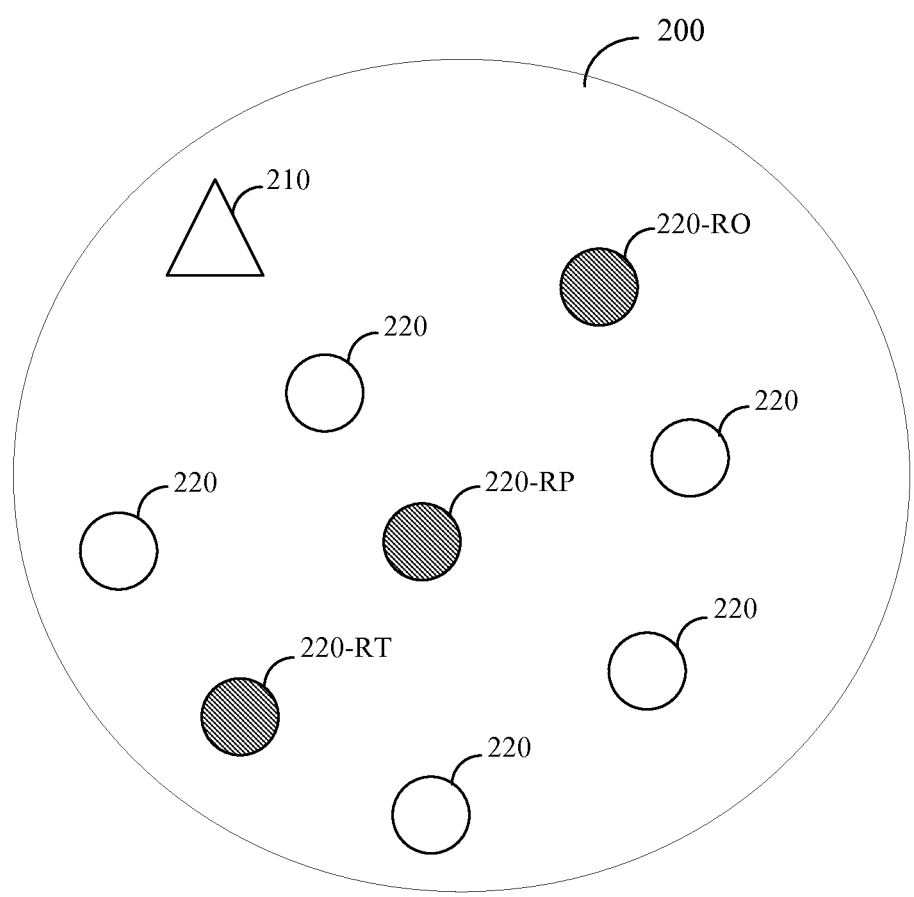
FIG. 2 is a diagram of a wireless network for describing the embodiments of the present invention.

FIG. 2 shows an exemplary diagram of a wireless network 200 for describing the embodiments of the invention. The wireless network 200 can operate in either a distributed mode or a centralized mode. The wireless network 200 includes devices 220 and at least one master device 210. Each of the devices 220 or the master device 210 may be a beacon device, i.e., a device that transmits beacons during the BP 110 shown in FIG. 1. The CRP is performed by two or more entities that include a Reservation Owner (RO), a Reservation Target (RT), and a Reservation Proxy (RP). Each device in the wireless network 200 can act as any of these entities. For the sake of discussion, the device 220-RO, device 220-RT, and device 220-RP perform the functions defined for a Reservation Owner, a Reservation Target, and a Reservation Proxy, respectively.

The device 220-RO is typically a source device that initiates the reservation process in order to establish a new session, while supporting quality of service (QoS). The device 220-RO tries to establish a session with the device 220-RT. The session is either an application layer session or a link layer session. The device 220-RP is a beaconing device that grants the reservation. Depending on the type of the network, the device 220-RP may be a target device 220-RT, an owner device 220-RO, or any other beaconing device in the network. Therefore, before initiating a negotiation process for medium access slots, the device 220-RO determines which of the devices in the network should act as a target device 220-RT and a proxy device 220-RP, and a type of the reservation mode that can be used. As described in detail below, the reservation mode can be either an implicit reservation or explicit reservation.

This determination is based on a predefined set of rules. Specifically, the negotiation process (or a reservation type) is a Peer-to-Peer (P2P) Negotiation, if the device 220-RO is a beaconing device operating in the distributed mode, and it has identified a device 220-RT as a beaconing device operating in the distributed mode. This type of negotiation is also applicable when the device 220-RO is a master device (e.g., device 210 in FIG. 2) or a slave device that is also a beaconing device, and a target device 220-RT is a beaconing device operating not under the control of the master device. That is, the device 220-RT is a beaconing device from another subnet (or group). In this type of negotiation, the device 220-RO sets the device 220-RT as a reservation target for corresponding reservations. The negotiation mode may be either implicit or explicit.

The reservation type is determined to be a Slave-Initiated Negotiation if the device 220-RO is a slave device operating under the control of a master device, and a target device 220-RT is the master device of the owner device 220-RO or another slave device under the control of the same master device. In this case, the device 220-RO sets the device 220-RT as the master device for the reservation. In addition, the device 220-RO can use only the explicit reservation mode if it is not a beaconing device. If it is a beaconing device, either the implicit or explicit mode can be used. It should be noted that slave devices typically do not send beacons. In some embodiments slave devices can be promoted to become beaconing devices by the master device.

Another type of a reservation process is the Master-Initiated Negotiation. This type is applied when the device 220-RO is a master device, and a target device 220-RT is a device in its group (or subnet). In this type of negotiation the master device 210 acts as the device 220-RP. Therefore, the master device 210 can initiate the reservation without transmitting any request (REQ). In accordance with an embodiment of the invention, a master device or device 220-RP can grant reservations to a group of devices.

In all types of negotiations described above, a reservation response (R-RSP) is carried in a beacon to facilitate coexistence, as devices in the same or in different groups (or networks) can receive and reliably decode the beacon, thereby obtaining information regarding the reservations. The R-RSP indicates at least the reservation type and whether a reservation is accepted, rejected, pending or a modified reservation has been suggested.

Figure 3:
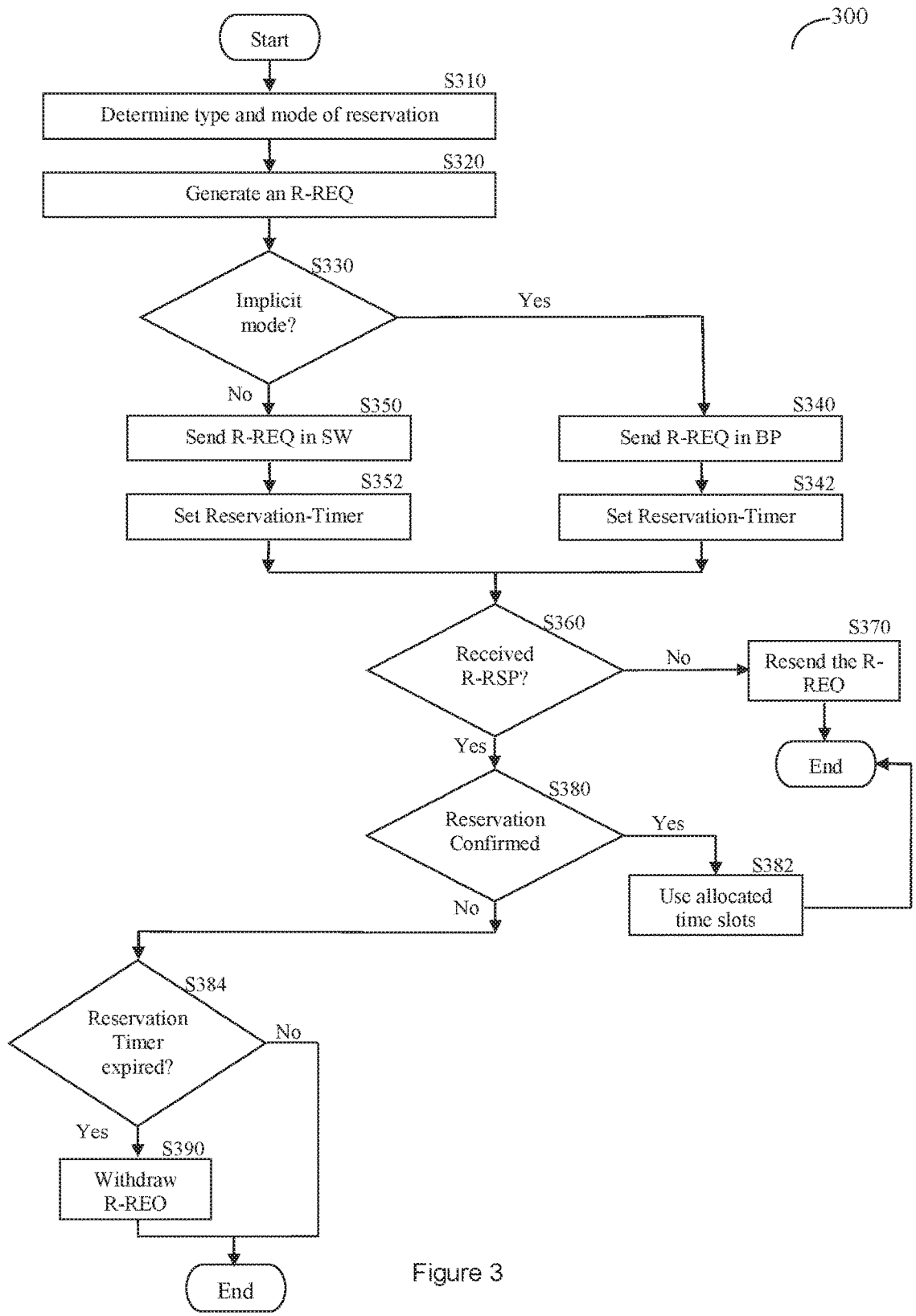
FIG. 3 is a flowchart for describing the channel reservation process in accordance with an embodiment of the present invention.

FIG. 3 shows an exemplary and non-limiting flowchart 300 for describing the channel reservation process in accordance with an embodiment of the invention. The process can be applied in networks employing a Flex-MAC protocol.

At S310 the type and mode of a reservation is determined. As mentioned above, the reservation mode may be either implicit or explicit, while the reservation type may be either one of Peer-to-Peer (P2P) Negotiation, Slave-Initiated Negotiation, or Master-Initiated Negotiation. At S320, a reservation request (R-REQ) frame is generated. In accordance with an embodiment of the invention, the R-REQ is constructed as a CRP information element (IE) 400 as depicted in FIG. 4.

Figures 4, 5:
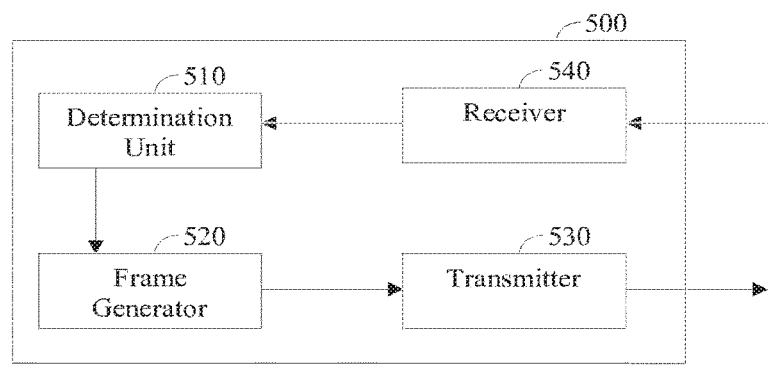
FIG. 4 is a diagram for illustrating a format of Channel Reservation Protocol information element (CRP-IE) in accordance with the present invention.
FIG. 5 is block diagram of a network device configured to reserve channel access time slots in a wireless network employing a flexible MAC protocol.

The CRP-IE 400 of FIG. 4 includes the following fields: an element ID 410 for identifying the type of the information element, a length 420 for designating the total length (e.g., in terms of number of bytes) of the CRP-IE 400; a CRP control 430; an owner device address (DevAddr) 440; a reservation proxy (RP) device address (DevAddr) 450; a target device address (DevAddr) 460; and a number (N) of CRP allocation fields 470-1 through 470-N. The integer number N of allocation fields is the number of channel allocations that a device can research. A channel allocation is a set of continuous time slots and multiple disjoint allocations within the same super-frame that can be reserved for a single device. The CRP control field 430 includes at least the following sub-fields (not shown): a reservation type, a stream index for indicating a user priority utilized during packets scheduling, a reason code for indicating the status of the reservation, i.e., confirmed, pending, or approved, a request for indicating either a R-REQ or a reservation response (R-RSP), the R-REQ option is set by an owner device 220-RO, a Tie-Break number which is an integer number being selected based on the reservation type and a priority of the traffic stream, and an unsafe bit designating any excess of reservation limits. A CRP allocation field includes the number of medium access slots allocated for a device 220-RO.

Referring back to FIG. 3, at S330 it is checked if the reservation mode is an implicit reservation, and if so execution continues with S340; otherwise, the mode is an explicit reservation and execution proceeds to S350 (checking may be performed for either or both modes). At S340, R-REQ frame is transmitted to a proxy device 220-RP within the beacon period (e.g., BP 110 shown in FIG. 1). At S342 a timer (hereinafter the "Reservation-Timer") is set to a maximum expected time for the negotiation process to be completed. As described below, the Reservation-Timer allows recovering from a case that the reservation is not confirmed within a reasonable period of time.

At S350, an explicit reservation is initiated by transmitting the R-REQ frame during a signaling window (e.g., SW 130 shown in FIG. 1) of a flexible superframe. The R-REQ is addressed to a proxy device 220-RP that should respond with an acknowledgment (ACK) frame within a short interframe space (SIFS) time. The ACK frame indicates to the device 220-RO that the R-REQ has been received by the device 220-RP and a response will follow in the next beacon period (BP). It should be noted that since the signaling window is typically at the end of the flexible superframe, the negotiation between devices 220-RO and 220-RP is generally completed within a very short time interval and with small overhead. It should be further noted that if a device 220-RO does not receive an ACK frame for the R-REQ, the transmission fails and the R-REQ frame will be retransmitted after a random back-off procedure. The back-off procedure can be defined by the access mechanism used during the signaling window. At S352, upon receiving the ACK frame, the device 220-RO sets the Reservation-Timer as described above.

At S360, a check is made to determine if an R-RSP frame has been received from the device 220-RP. The R-RSP is transmitted in a beacon during the beacon period and may be formatted as the CRP-IE 400. When an R-RSP is constructed as the CRP-IE 400, the request subfield in the control field 430 is set to '0', indicating that the CRP-IE 400 is a response. In addition, the reservation status subfield is set to indicate the status of the reservation, i.e., pending, confirmed, or modified, and the CRP allocation field 470 includes the medium access slots allocated for the device 220-RO. The device 220-RP includes the R-RSP frame in the next beacon period, even if the device 220-RP has not yet decided whether to confirm the reservation. Non-confirmed reservations are indicated as pending.

If S360 results in a negative answer, i.e., the device 220-RO has not received an R-RSP frame from the device 220-RP, execution continues with S370 where the device 220-RO retransmit the R-REQ in the next signaling window or beacon period. The retransmission may be performed for a predefined number of attempts. Thereafter, the negotiation process is determined as failed, and execution terminates.

The process reaches S380 if the R-RSP frame has been received during the beacon period, and now it is checked if the reservation request has been confirmed, i.e., the device 220-RP grants one or more medium access time slots to the device 220-RO. If so, at S382, at least the device 220-RO announces and uses the allocated time slots during the next flexible superframe. The way that reservations are confirmed and announced depends on the type of the negotiation process. The procedure details associated with each type are provided below. If the R-REQ is still pending, at S384 it is checked if the Reservation-Timer has expired, and if so the process continues with S390 where the request is either withdrawn or retransmitted. Otherwise, the process returns to S360 where the device 220-RO waits for another R-RSP with a confirmed reservation indication <MBS: I have corrected FIG. 3>. It should be noted that when the R-REQ is withdrawn, the device 220-RO performs a random backoff procedure before initiating a new R-REQ. In accordance with an embodiment of the invention, the backoff procedure includes selecting a random integer number M of superframes within an interval [0, BackoffWindow −1]. The BackoffWindow is a configurable parameter used by the random backup procedure. The device 220-RO should not transmit any reservation request for N superframes.

As mentioned above, to conclude the negotiation process, the reservations should be confirmed by the device 220-RP or by both device 220-RO and device 220-RP, which may be the target in some cases depending on the type of negotiation process. Specifically, in a P2P negotiation, both device 220-RO and device 220-RP (or device 220-RT) should agree on the conclusion of the negotiation process and announce an active reservation before transmitting in the reserved time slots. Therefore, when sending an R-RSP frame responsive to the R-REQ, the device 220-RP indicates that the reservation is active. This can be performed, for example, by setting the reservation status subfield in the control field 430. When the device 220-RO receives the R-RSP with the reservation status subfield bit set to '1', it will announce the reservation in its next beacon including a new CRP-IE. The device 220-RO also sets the status subfield in the new CRP-IE to indicate that the reservation has been accepted and no conflict with other reservations was detected by the device 220-RO.

In a Slave-Initiated and Master-Initiated negotiation type, only the device 220-RP or a master device is responsible for advertising in its beacon the conclusion of the process and when the reservation is active. When a new reservation has been granted, the device 220-RP (or the master device) sends the R-RSP with an indication that the reservation was accepted. In addition, the reservation status subfield in the control field 430 is set to one. When the reservation is granted, both the device 220-RO and device 220-RT may start using this reservation in the next superframe.

If a requested reservation is modified by the device 220-RP, the device 220-RO may decide to accept the new reservation or to start a new reservation process.

When a P2P reservation is confirmed, both devices 220-RO and 220-RT announce the reservation in their beacons as long as the reservation remains active. When the reservation is either Slave-Initiated or Master-Initiated, if the reservation is confirmed, the device 220-RP announces in its beacons all active reservations it has granted.

In accordance with certain embodiments of the invention, the entities of devices 220-RO, 220-RT and 220-RP can resolve and detect reservation conflicts that may occur, for example, when multiple devices reserve the same time slots. Conflicts can occur before or after the reservation becomes active and can be detected as the reservations are announced in the beacon. The way reservation conflicts are detected and resolved depends on the type of negotiation process. Specifically, for the P2P negotiation process, the device 220-RO resolves any conflicts with other devices that may have reserved the same time slots. On the other hand, in Slave-Initiated and Master-Initiated negotiation processes, the device 220-RP is responsible for resolving any conflicts, although all devices may collaborate in detecting the conflicts.

Following is provided a set of non-limiting rules utilized to resolve reservation conflicts: 1) when a device 220-RT detects a possible conflict, it indicates the conflict in its reservation announcement if the device 220-RT is a beaconing device, in this case, the device 220-RT may not use the reservation; 2) when a device reservation conflicts with a time slot reserved for a beacon transmission, the device should not use this reservation, but rather the device modifies or withdraws the reservation (the beacon slots have higher priority over any other reservations); 3) devices with active reservations may maintain their reservations when detecting conflicts with reservations that are not active; 4) devices with reservations that are not active yet should withdraw or modify the reservations if they detect a conflict with an active reservation (i.e., active reservations have higher priority); and 5) when two devices with reservations in the same status detect a conflict, these devices should use the reservation Tie-Break number (Ntb) to resolve such a situation. The Ntb is a random number selected by the device that makes the reservation request and it remains the same during the negotiation process as long as the reservation is valid. Then, the device whose reservation has a smaller Ntb should withdraw or modify the reservation. The Ntb number may be selected using a uniform distribution within interval [0, TBreakWindow(i)], where TBreakWindow(i) is a configurable parameter that depends on the type of reservation or the priority of traffic streams. For example, traffic streams with stricter QoS requirements may use a higher value for the TBreakWindow.

FIG. 5 shows a non-limiting block diagram of a network device 500 configured to reserve channel access time slots in a wireless network employing a flexible MAC protocol. The network device 500 includes a determination unit 510, a frame generator 520, a transmitter 530, and a receiver 540. The determination unit 510 determines at least a type and a mode of a channel reservation. In addition, the determination unit 520 determines if channel reservation requests have been confirmed by a proxy or target device. The frame generator 520 generates reservation request frames based on the determined type and mode of the channel reservation. The transmitter 530 transmits reservation request frames and messages for announcing usage of allocated time slots for confirmed channel reservation requests. The receiver 540 receives reservation response frames from reservation proxy devices. In accordance with one embodiment of the invention the network device 500 acts as a reservation owner device 220-RO.

The teachings of the CRP, negotiation processes, and/or CRP-IE format disclosed herein can be implemented in wireless networks including but not limited to, cognitive wireless networks, ultra-wide band (UWB) based networks, IEEE 802.11 based networks, and IEEE 802.15 based networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. One of ordinary skilled in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for reserving channel access time slots in a wireless network, comprising:
   employing a flexible medium access control (Flex-MAC) protocol;
   determining at least a type and a mode of the channel reservation based on whether the wireless network is operating under a centralized mode of resource allocation or a distributed mode of resource allocation, both the centralized and distributed modes of resource allocation being supported by the Flex-MAC protocol, which enables a transition between the centralized mode and the distributed mode while maintaining ongoing connections;
   generating a reservation request frame based on the determined type and mode of the channel reservation;
   sending the reservation request frame to a reservation proxy device;
   in response to the reservation request frame, receiving a reservation response frame from the reservation proxy device; and
   announcing usage of an allocated time slot if a channel reservation request is confirmed in the reservation response frame,
   wherein the mode of the channel reservation is either implicit reservation or explicit reservation;
   wherein when the mode of the channel reservation is implicit reservation, the reservation request frame is sent during a beacon period; and
   wherein when the mode of the channel reservation is explicit reservation, the reservation request frame is sent during a signaling window.

2. The method of claim 1, wherein the type of the reservation is one selected from a peer-to-peer negotiation, a slave-initiated negotiation, and a master-initiated negotiation.

3. The method of claim 1, wherein the reservation response frame is transmitted in a beacon period subsequent to the sending of the reservation request frame.

4. The method of claim 3, wherein the reservation request frame is re-sent a predetermined number of times if the reservation response frame is not received during the subsequent beacon period.

5. The method of claim 1, wherein the reservation request frame is withdrawn if the reservation response frame is not confirmed and a predetermined time interval is elapsed.

6. The method of claim 1, wherein the reservation response frame is confirmed by at least one of the reservation proxy device, a reservation target device, and a master device.

7. The method of claim 1, wherein reservation conflicts are resolved by an owner device when the type of the reservation is peer-to-peer negotiation.

8. The method of claim 1, wherein reservation conflicts are resolved by the reservation proxy device when the type of the reservation is either master-initiated negotiation or slave-initiated negotiation.

9. The method of claim 1, wherein the reservation request frame is constructed as a channel reservation protocol (CRP) information element, wherein a CRP information element includes at least the following fields: a CRP control; an owner device address (DevAddr); a reservation proxy (RP) device address (DevAddr); a target device address (DevAddr); and a plurality of allocation fields.

10. The method of claim 9, wherein the CRP control field includes the following sub-fields: a reservation type, a stream index, a reason code, a request, a Tie-Break number, and an unsafe bit.

11. The method of claim 10, wherein a request subfield indicates that the CRP information element is a reservation response frame.

12. A network device configured to reserve channel access time slots in a wireless network, comprising:

a processor configured to:

operate under a flexible medium access control (Flex-MAC) protocol;

determine at least a type and a mode of the channel reservation based on whether the wireless network is operating under a centralized mode of resource allocation or a distributed mode of resource allocation, both the centralized and distributed modes of resource allocation being supported by the Flex-MAC protocol, which enables a retransition between the centralized mode and the distributed mode while maintaining ongoing connections;

generate a reservation request frame based on the determined type and mode of the channel reservation;

a transmitter configured to transmit the reservation request frame, wherein the transmitter is further configured to transmit a message for announcing usage of an allocated time slot if a channel reservation request is confirmed in a received reservation response frame; and a receiver configured to receive a reservation response frame from a reservation proxy device in response to the reservation request frame, wherein the mode of the channel reservation is either implicit reservation or explicit reservation;

wherein when the mode of the channel reservation is implicit reservation, the reservation request frame is sent during a beacon period; and wherein when the mode of the channel reservation is explicit reservation, the reservation request frame is sent during a signaling window.

\* \* \* \* \*